Dec. 14, 1954    E. SCHÜTZ    2,696,647
DEVICE FOR THE PRODUCTION OF CENTRIFUGALLY
CAST SEMIFINISHED ARTICLES
Filed Dec. 19, 1951
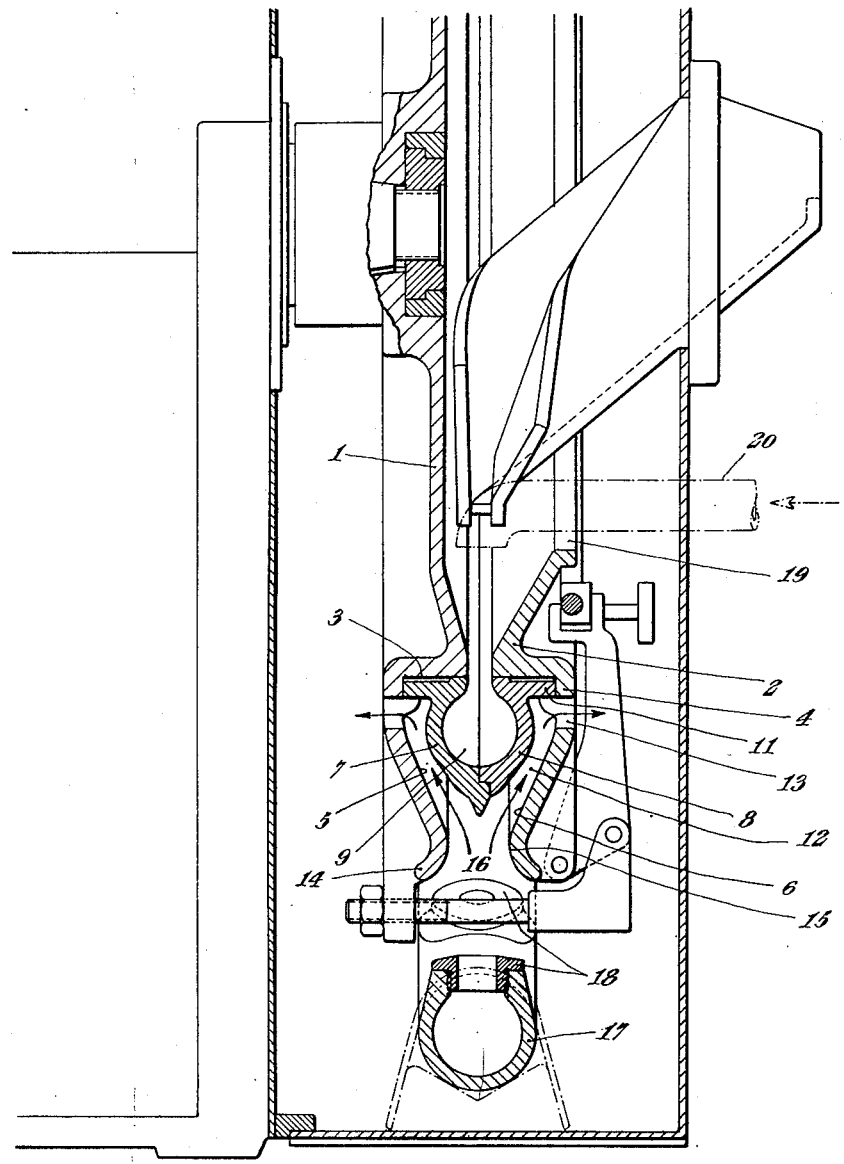
INVENTOR:
EDWIN SCHÜTZ

United States Patent Office 2,696,647
Patented Dec. 14, 1954

2,696,647

DEVICE FOR THE PRODUCTION OF CENTRIFUGALLY CAST SEMIFINISHED ARTICLES

Edwin Schütz, Baden, Switzerland, assignor to Aktiengesellschaft Oederlin & Cie, Baden, Switzerland Application December 19, 1951, Serial No. 262,363

Claims priority, application Switzerland May 7, 1951

3 Claims. (Cl. 22—65)

The present invention refers to a device for the production of centrifugally cast semi-finished products of metal which are highly ductile and malleable for subsequent working up into rods and pressed parts.

According to the invention the metal crystals forming the centrifugal casting are controlled in their orientation and location in the centrifugally cast semi-finished articles by a suitable choice of melting and pouring temperatures and of the circumferential speed of the mold during pouring and by a specially increased cooling during solidification in such a manner that the crystalline aggregate forming the metallic mass retains a crystalline form whereby equally shaped crystals are uniformly distributed throughout the mass. The semi-finished products thus produced are completely free of stress or unstrained and the finished articles produced therefrom have practically no tensile strength in spite of considerable cold working.

The device according to this invention comprises at least one two-part die located within a mold, the die being at least partly detachably located in the mold in order to afford an increased cooling rate of the latter. The mold is provided with radially extending rim or edge portions provided with an air gap between said portions and the die to thereby define an annular space or opening through which cooling air is supplied.

In material to be worked upon subsequently the properties of the rough casting used as a semi-finished product are of the greatest importance depending upon the nature of the operations to be performed upon said product. The choice of the melting and pouring temperatures as well as the circumferential speed of the rotating mold all have an effect upon the size and uniformity of the first crystals produced so that the latter are smaller than in ordinary castings. As a result of rapid cooling and the special pouring conditions a great number of space lattices are formed by the binding of the atoms. Due to the union and the accretion of the space lattices there results an accelerated formation of the crystals whereby a great number of not unilaterally oriented crystals of fairly equal size is obtained. Then crystals due to their particular size and orientation can be very evenly deformed so that subsequently it is possible to considerably cold work the metallic mass built up by these crystals. The first crystals formed are approximately a tenth power smaller than those of a statically cast casting of the same composition. A controlled orientation of these first small crystals located in the outer parts of the centrifugally cast metallic mass permits a greater deformation of said mass. Therefore the resistance to deformation of a centrifugally cut metallic mass is lower and the deformability of the latter is greater than the resistance to deformation and deformability of statically cast castings with irregularly oriented crystallites of unequal size. The uniform surface of the casting obtained according to the invention is conditioned by the regular orientation of the small crystals.

By way of example a device according to the invention is illustrated in the accompanying drawing.

According to the drawing the device for carrying out the method consists of a mold rotating about a horizontal axle carried by a fixed support. This mold has two complementary elements terminating in radially extending spaced apart and suitably profiled rim or edge portions forming an annular rim. This annular rim 2 is arranged opposite to mold 1, and may be clamped to the one half of the mold by means, now shown in the drawing without reference characters. Both mold 1 and rim 2 have annular recesses 3 and 4 and 5 and 6 into which the two-part die 7 and 8 is inserted. The two complementary sections of the die are joined at their extremities at which they form a dividing edge for a bifurcated passageway 12, as will be explained further below. The die parts define a cavity 9 for outlining the surface of the ring-shaped product which will be centrifugally cast. The die parts 7 and 8 are detachably held between the mold parts 1 and rim 2 and within the recesses 3, 4 by means of flange portions 11 arranged at the inside end of die parts 7 and 8. The spaces or bifurcated passageway 12 are defined between the walls of said mold 1 and rim 2 and said passageways are connected and communicate with the perforations 13. The rim or edge portions 14 extend beyond the two-part die 7 and 8 and are of a larger diameter than said die so that an annular opening or gap 15 is formed between the rim portion and the two-part die. A current of air is forced in the direction of the arrow 16 through gap 15 in order to cool the die and in order to rapidly cool the ring centrifugally cast in the latter. The current of air is supplied from ring-shaped pipe 17, with nozzle-like inserts 18, which is arranged around the mold 1 and rim 2. The ring-shaped or annular pipe or conduit 17 is connected to a centrifugal blower and stop means, not shown in the drawing, so that immediately upon completion of the pouring of the molten mass into the rotating die, the die and the mold can be cooled by compressed air.

The pouring trough extends within the annular rim 2 through the aperture 19. Also, cooling air can be fed into said aperture 19 by means of at least one pipe 20.

It can thus be seen, that there has been provided according to this invention a device for preparing centrifugally cast articles comprising a rotatably arranged mold including a pair of opposed complementary elements terminating in radially extending edge portions having perforations therein, said edge portions being spaced apart from each other and form at their outer ends an annular opening, a ring-shaped die having flange means supported on said edge portions therewithin and spaced from the inner faces of said edge portions, said die including a pair of opposed complementary sections having extremities engaged with each other to thereby form a dividing edge, said die sections and said mold elements defining therebetween a bifurcated passageway, said bifurcated passageway communicating with the atmosphere through the perforations of said edge portions, ring-shaped cooling fluid conduit means spaced from and surrounding the annular opening at said edge portions, and nozzle means on said conduit means and directed toward said dividing edge of said bifurcated passageway for directing cooling fluid into the latter, whereby increased cooling of the article when contained in said ring-shaped die is achieved during rotation of said mold by additional sucked-in air through said annular opening when cooling fluid is pressed through said nozzle means into said bifurcated passageway, and then out of said perforations of said edge portions.

While the preferred embodiment of the invention has been shown and herein described, it will be understood that the same is capable of modification without departure from the general scope and spirit of the invention as defined in the claims.

Having thus described the invention, what is claimed as new and desired to be secured by Letters Patent, is:

1. A device for producing centrifugally cast articles comprising a rotatably arranged mold including a pair of opposed complementary elements terminating in radially extending edge portions having perforations therein, said edge portions being spaced apart from each other and form at their outer ends an annular opening, a ring-shaped die having flange means supported on said edge portions therewithin and spaced from the inner faces of said edge portions, said die including a pair of opposed complementary sections having extremities engaged with each other to thereby form a dividing edge, said die sections and said mold elements defining therebetween a bifurcated passageway, said bifurcated passageway communicating with the atmosphere through the perforations of said edge portions, ring-shaped cooling fluid conduit means spaced from and surrounding the annular opening at said edge portions, and nozzle means on said conduit means and directed toward said dividing edge of said bifurcated passageway for directing cooling fluid into the latter, whereby increased cooling of the article when contained in said ring-shaped die is achieved during rotation of said mold by additional sucked-in air through said annular opening when cooling fluid is pressed through said nozzle means into said bifurcated passageway, and then out of said perforations of said edge portions.

2. A device according to claim 1, wherein said edge portions are substantially S-shaped in cross-section and flare outwardly toward said annular opening.

3. A device for producing centrifugally cast articles comprising a rotatable, two-part mold including a pair of complementary spaced elements terminating in radially extending perforated edge portions, the extremities of said edge portions being spaced apart to form an annular opening, a ring-shaped die provided with flanges supported on said edge portions within recesses thereof and adjacent the perforations of said edge portions, said die including a pair of spaced apart complementary sections extending from said flanges and terminating in ends engaging each other and defining a dividing edge for a bifurcated passageway formed by spaces between said edge portions and said die sections, ring-shaped cooling fluid conduit means positioned adjacent and communicating with said annular opening of said edge portions, and spaced nozzle means on said conduit means and directed toward said dividing edge of said bifurcated passageway for directing cooling fluid to the latter, whereby increased cooling of the cast article when received within said die is achieved during rotation of said mold and said die by causing suction of air into said annular opening through said cooling fluid passing through said bifurcated passageway and then out of said perforations of said edge portions for escape to the atmosphere.

References Cited in the file of this patent

UNITED STATES PATENTS

| Number | Name | Date |
|---|---|---|
| 482,405 | Farnum | Sept. 13, 1892 |
| 1,870,406 | Douteur | Aug. 9, 1932 |
| 1,908,607 | Hokin | May 9, 1933 |
| 2,536,692 | Miller | Jan. 2, 1951 |

FOREIGN PATENTS

| Number | Country | Date |
|---|---|---|
| 618,866 | Great Britain | Mar. 1, 1949 |